United States Patent
Mochizuki et al.

(10) Patent No.: US 8,526,291 B2
(45) Date of Patent: Sep. 3, 2013

(54) OPTICAL INFORMATION RECORDING MEDIUM

(71) Applicant: FUJIFILM Corporation, Tokyo (JP)

(72) Inventors: Hidehiro Mochizuki, Odawara (JP);
Tatsuo Mikami, Odawara (JP);
Shunichi Hoshino, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/739,668

(22) Filed: Jan. 11, 2013

(65) Prior Publication Data
US 2013/0128710 A1 May 23, 2013

Related U.S. Application Data

(63) Continuation of application No. PCT/JP2011/064676, filed on Jun. 27, 2011.

(30) Foreign Application Priority Data

Jul. 13, 2010 (JP) ................................. 2010-158584

(51) Int. Cl.
*G11B 7/00* (2006.01)

(52) U.S. Cl.
USPC ........................... 369/275.3; 369/103; 369/94

(58) Field of Classification Search
USPC ............... 369/94, 275.1, 275.2, 275.3, 275.4, 369/103; 359/3; 430/1, 2, 281.1, 270.1, 430/270.14
See application file for complete search history.

(56) References Cited

U.S. PATENT DOCUMENTS

| | | | |
|---|---|---|---|
| 6,512,606 B1 * | 1/2003 | Lipson et al. | 359/3 |
| 8,054,727 B2 | 11/2011 | Shiono | |
| 8,116,194 B2 | 2/2012 | Iwamura et al. | |

(Continued)

FOREIGN PATENT DOCUMENTS

| JP | 1-14038 A | 1/1989 |
|---|---|---|
| JP | 7-85478 A | 3/1995 |

(Continued)

OTHER PUBLICATIONS

Teruhiro Shiono et al., "Two-Photon Absorption Recording in Photochromic Diarylethenes Using Laser Diode for Three-Dimensional Optical Memory", Japanese Journal of Applied Physics, May 24, 2005, pp. 3559-3563, vol. 44, No. 5B.

(Continued)

*Primary Examiner* — Nabil Hindi
(74) *Attorney, Agent, or Firm* — Sughrue Mion, PLLC

(57) ABSTRACT

Optical information recording medium comprises: a plurality of recording layers 14, each of which undergoes a change in refractive index by irradiation with recording beam; and an intermediate layer 15 provided between recording layers 14. The recording layer 14 contains polymer binder and dye dispersed in the polymer binder, and at least in proximity to an interface (far-side interface 18) between the intermediate layer 15 and a recording layer 14 disposed adjacent to incident side of the intermediate layer 15 from which the recording beam enters the intermediate layer, the intermediate layer 15 has refractive index different from that of the recording layer 14. Glass transition temperature of the polymer binder is lower than melting point and decomposition point of the dye, and refractive index of the polymer binder changes by receiving heat generated when the dye absorbs the recording beam, whereby information is recordable in the recording layer.

10 Claims, 9 Drawing Sheets

(56) References Cited

U.S. PATENT DOCUMENTS

| | | |
|---|---|---|
| 2006/0246375 A1 | 11/2006 | Shiono et al. |
| 2009/0161502 A1 | 6/2009 | Shiono |
| 2010/0110858 A1 | 5/2010 | Iwamura et al. |
| 2011/0090780 A1 | 4/2011 | Shiono et al. |

FOREIGN PATENT DOCUMENTS

| | | |
|---|---|---|
| JP | 8-138245 A | 5/1996 |
| JP | 2004-347642 A | 12/2004 |
| JP | 2006-190347 A | 7/2006 |
| JP | 2009-140528 A | 6/2009 |
| JP | 2009-170013 A | 7/2009 |
| JP | 2009-277271 A | 11/2009 |
| JP | 2010-86568 A | 4/2010 |
| WO | 2004/107040 A1 | 12/2004 |
| WO | 2007/055249 A1 | 5/2007 |

OTHER PUBLICATIONS

Shiono, Optronics (2005), No. 7 Two Photon Aborption Recording Medium in Photochromic Materials Using Laser Diode, pp. 173-178.

Yuki Suzuki et al., "The static recording and readout of the twenty-recording layers containing organic dye materials", ISOM Technical Digest, 2009, p. 202.

International Search Report for PCT/JP2011/064676 dated Aug. 30, 2011, 5 pages in Japanese and English.

Written Opinion for PCT/JP2011/064676 dated Aug. 30, 2011.

\* cited by examiner

DURING RECORDING

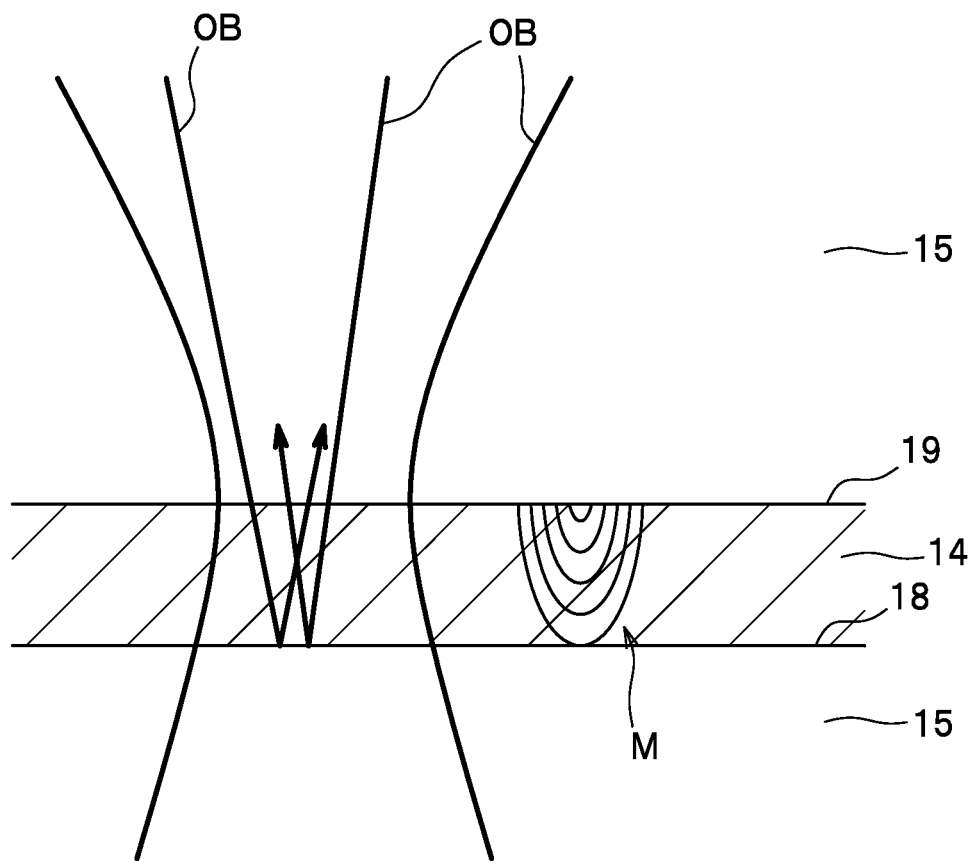

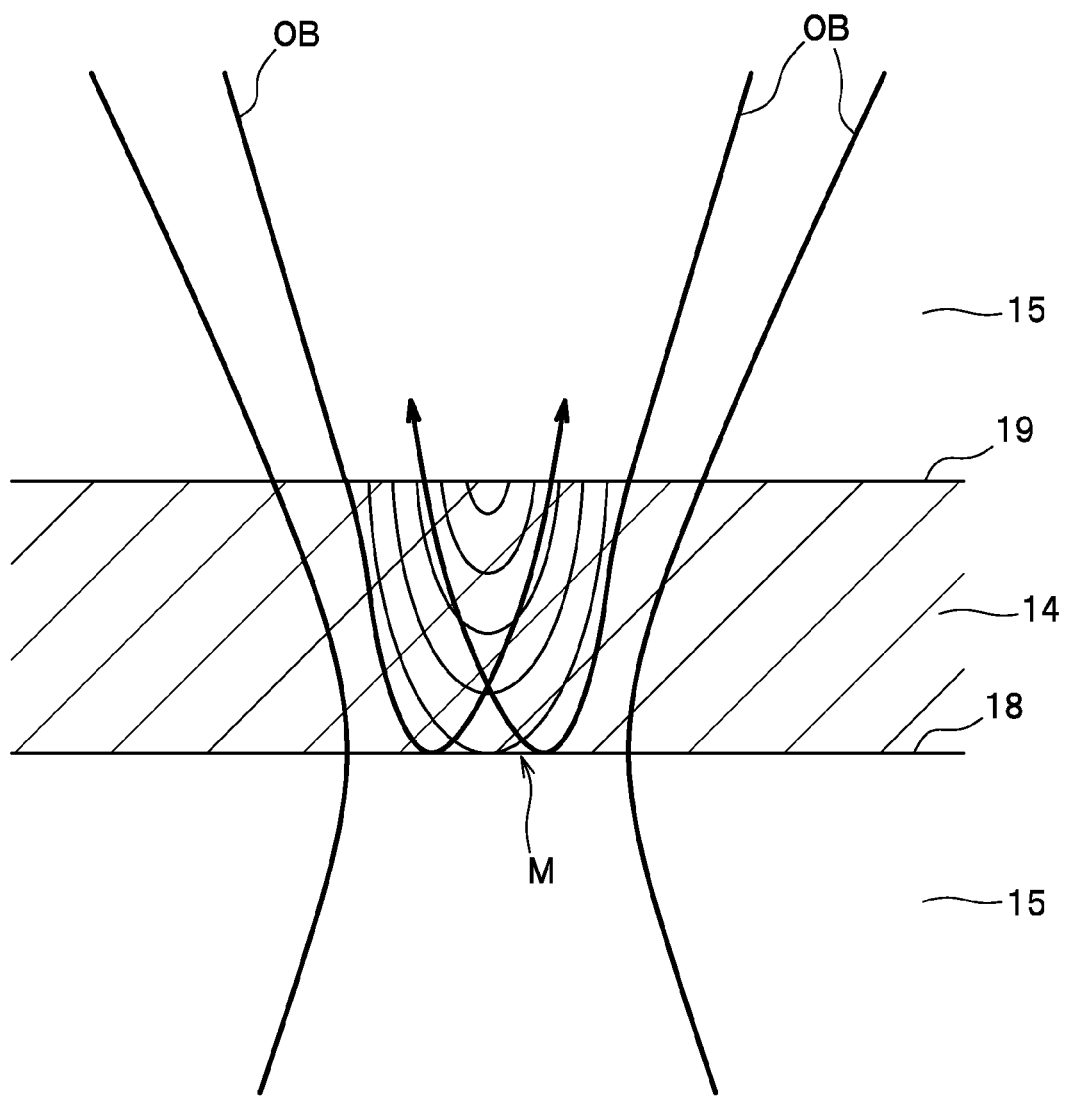

FIG. 9

| | Example 1 | Example 2 | Example 3 | Example 4 | Comparative Example 1 | Comparative Example 2 |
|---|---|---|---|---|---|---|
| Polymer binder | PVAc | PVAc | PVAc | PMMA | None | Polybisphenol-A-carbonate |
| Dye | C-1 | C-2 | C-1 + C-2 | C-2 | C-2 | C-2 |
| Glass transition temperature of Polymer binder [°C] | 32 | 32 | 32 | 104 | - | 147 |
| Melting point or Decomposition point [°C] | 349 | 138 | 138 | 138 | 138 | 138 |
| Film thickness [μm] | 1.0 | 1.0 | 1.0 | 1.0 | 0.1 | 1.0 |
| Refractive index of Recording layer | 1.48 | 1.48 | 1.48 | 1.50 | 1.60 | 1.60 |
| Absorption ratio (Wavelength: 522 nm) | 1.8 | 0 | 1.8 | 0 | 1.8 | 0 |
| Time required for Recording [μsec] | 15 | 90 | 5 | 450 | Unrecordable | Unrecordable |

OPTICAL INFORMATION RECORDING MEDIUM

CROSS-REFERENCE TO RELATED APPLICATION(S)

This application is a continuation application of International Application No. PCT/JP2011/064676 filed on Jun. 27, 2011, which claims priority to Japanese Patent Application No. 2010-158584 filed on Jul. 13, 2010, the disclosures of which are incorporated herein by reference in their entity.

TECHNICAL FIELD

The present invention relates to an optical information recording medium.

BACKGROUND ART

In general, as recording materials for an optical information recording medium, organic recording materials mainly consisting of dye and inorganic recording materials mainly consisting of metal have been used. These recording materials change (decomposition, phase change or the like) by making use of energy obtained from absorption of a recording beam, to thereby form recording marks. For applying this principle of recording mark formation, it is necessary that irradiation with the recording beam provides a recording material with energy required to raise the temperature of the recording material to a temperature at which the recording material undergoes decomposition or a phase change.

In recent years, as a technique for greatly increasing the capacity of an optical information recording medium, study has been made on a three-dimensional recording in which information is recorded in multiple layers of a single recording medium. In the three-dimensional recording, it is necessary that the light absorption ratio of the recording layers be set to a smaller value in order to allow the recording beam to reach deeper recording layers. However, according to the recording materials used for the conventional optical information recording medium, if the light absorption ratio is lowered, the recording layer will not receive sufficient energy from the recording beam, which results in insufficient recording sensitivity.

Patent Literature 1 and Patent Literature 2 disclose other recording methods, in which in place of the recording material mainly consisting of dye which undergoes a change, a polymer binder which contains dye is used in a recording material, and the polymer binder undergoes a change by receiving energy that is absorbed by the dye.

Citation List

Patent Literature

Patent Literature 1: Japanese laid-open patent application publication No. 01-014038

Patent Literature 2: Japanese laid-open patent application publication No. 2004-347642

SUMMARY OF THE INVENTION

Technical Problem

However, according to an optical information recording medium disclosed in Patent Literature 1, the absorption ratio of the recording layer for the recording beam is set for 20% or greater in order to provide sufficient energy to cause a deformation in the recording layer. If the recording layer requires such a high absorption ratio as requisite for the recording layer, it is impossible to produce a multi-layered recording medium because one recording layer drains a large portion of energy of the recording beam.

In Patent Literature 2, study is made on recording with an ultrashort pulsed-laser beam, wherein a multi-photon absorption dye absorbs multi-photon absorption energy by irradiation with the ultrashort pulsed-laser beam to record information. However, since the probability for multi-photon absorption is extremely low, this method will result in insufficient recording sensitivity. Further, recording on an optical information recording medium disclosed in Patent Literature 2 is so-called bulk-type recording, in which recording marks are formed in several layers in a relatively thick recording layer. However, the bulk-type recording disadvantageously requires a difficult focus servo operation for bringing the recording beam into focus with different recording positions in the optical axis direction. Further, as reported by Teruhiro Shiono, Two-Photon Absorption Recording in Photochromic Materials Using Laser Diode, OPTRONICS by The Optronics Co, Ltd., No. 7, Page. 177 (2000), even if a portion of the recording mark is irradiated with the reading beam for reading out information, reflection light is not obtained at the portion of the recording mark, with the result that the information is not read out at least with a reflection-type scheme.

In view of the above, it is an object of the present invention to provide an optical information recording medium which enables recording at high sensitivity and reading in the reflection-type scheme.

Solution to Problem

In order to solve the aforementioned problem, the present invention provides an optical information recording medium comprising: a plurality of recording layers, each of which undergoes a change in a refractive index by irradiation with a recording beam; and at least one intermediate layer provided between the recording layers. In this optical information recording medium, each of the recording layers contains a polymer binder and dye dispersed in the polymer binder, and at least in proximity to an interface between the intermediate layer and a recording layer disposed adjacent to an incident side of the intermediate layer from which the recording beam enters the intermediate layer, the intermediate layer has a refractive index different from that of the recording layer. Further, a glass transition temperature of the polymer binder is lower than a melting point and a decomposition point of the dye, and a refractive index of the polymer binder changes by receiving heat generated when the dye absorbs the recording beam, whereby information is recordable in the recording layer.

According to this optical information recording medium, since the grass transition temperature of the polymer binder is lower than the melting point and the decomposition point of the dye, the refractive index of the polymer binder can be changed while the dye is capable of sufficiently absorbing the recording beam, so that information is recorded in the recording layers with high sensitivity. For this reason, the absorption ratio of each of the recording layers for the recording beam can be limited to a smaller value to provide a multi-layered medium having a plurality of recording layers. Further, the intermediate layer is provided between the recording layers, and at least in proximity to an interface between the intermediate layer and a recording layer disposed adjacent to an incident side of the intermediate layer from which the recording beam enters the intermediate layer, the intermediate layer has a refractive index different from that of the recording layer. This makes it possible to perform a focus servo operation in each of the recording layers as well as to read out information with, a reflection-type scheme. Further, it is possible to record information using modulation, as described later, in which the recording layer has an increased thickness to provide a lens effect.

In the aforementioned optical information recording medium, the recording layers may have an absorption ratio for the recording beam equal to or less than 5% per one layer.

With this configuration, since the absorption ratio per one layer is limited to a smaller value, a large number of recording layers can be provided.

In the aforementioned optical information recording medium, it is preferable that each recording layer has a thickness equal to or greater than $2\lambda/n$, where n is the refractive index of the recording layer and $\lambda$ is a wavelength of the recording beam.

As the recording layer has a thickness as described above, information is recordable by large modulation caused by the recording layer with a lens effect.

In the aforementioned optical information recording medium, it is preferable that in proximity to an interface between the intermediate layer and a recording layer disposed adjacent to the intermediate layer at a side opposite to the incident side from which the recording beam enters the intermediate layer, the intermediate layer has a refractive index substantially the same as that of the recording layer.

With this configuration, no reflection occurs at an interface between the intermediate layer and the recording layer at a far side of the intermediate layer (at a side opposite from the incident side from which the recording beam enters), the loss of the recording beam, the reading beam (light emitted on the medium at the time of reading out information), and the readout beam (light generated as a result of irradiation with the reading beam) is reduced at the interface, so that these beams can be used efficiently. It is to be noted that "having substantially the same refractive index" in this specification means that the difference between the refractive index of the recording layer and the refractive index of the intermediate layer is equal to or less than 0.05, preferably equal to or less than 0.03, more preferably equal to or less than 0.01, and most preferably, the difference between them is 0.

In the aforementioned optical information recording medium, the dye may comprise a one-photon absorption dye. As an alternative, the dye may comprise a multi-photon absorption dye. As a further alternative, the dye may comprise a one-photon absorption dye and a multi-photon absorption dye.

When the one-photon absorption dye is used as the dye, the absorption ratio of the dye may be adjusted into a range suitable for three dimensional recording. When the multi-photon absorption dye is used, the amount of multi-photon absorption may be increased by increasing the concentration of the multi-photon absorption dye within the solubility limit of the dye. Further, when the one-photon absorption dye and the two-photon absorption dye are used together, it is possible to enhance the recording sensitivity.

In the aforementioned optical information recording medium, since information is recorded using a change in the refractive index of the polymer binder, the information is erasable by heating, which allows re-recording of information.

Specifically, a method for erasing information recorded in the aforementioned optical information recording medium comprises the step of: heating the recording layer, whereby the information recorded in the recording layer is erased.

This step causes the information in the recording layer to disappear, so that repeated recording can be carried out.

When heating the recording layer, the recording layer may be irradiated with a continuous-wave laser beam while bringing the laser beam into focus on the recording layer. Irradiation with the continuous-wave laser beam causes a particular recording layer to be heated with the help of heat generated by light absorption of a (one-photon absorption) dye contained in the recording layer. Further, heating with the continuous-wave laser beam makes it possible to evenly erase the information recorded in a continuous region within the recording layer.

When heating the recording layer to erase the information, the optical information recording medium as a whole may be heated, whereby all the information recorded in the recording layer is erased. Accordingly, all the information recorded in the optical information recording medium is easily deleted for initialization. Further, when the optical information recording medium is disposed of, the information is easily deleted.

Other aspects and advantages of the present invention will become apparent from the following description taken in conjunction with the accompanying drawings.

BRIEF DESCRIPTION OF THE DRAWINGS

FIG. 7 is an explanatory view showing a focal position at the time of reading out the information and the reflection of the reading beam at a non-recorded position;

FIG. 8 is an explanatory view of a modified embodiment and showing the lens effect at the time of reading out information; and FIG. 9 is a table showing configurations and recording times with respect to examples and comparative examples.

DESCRIPTION OF EMBODIMENTS

One exemplified embodiment of the present invention will be described below with reference to the drawings.

Figure 1:
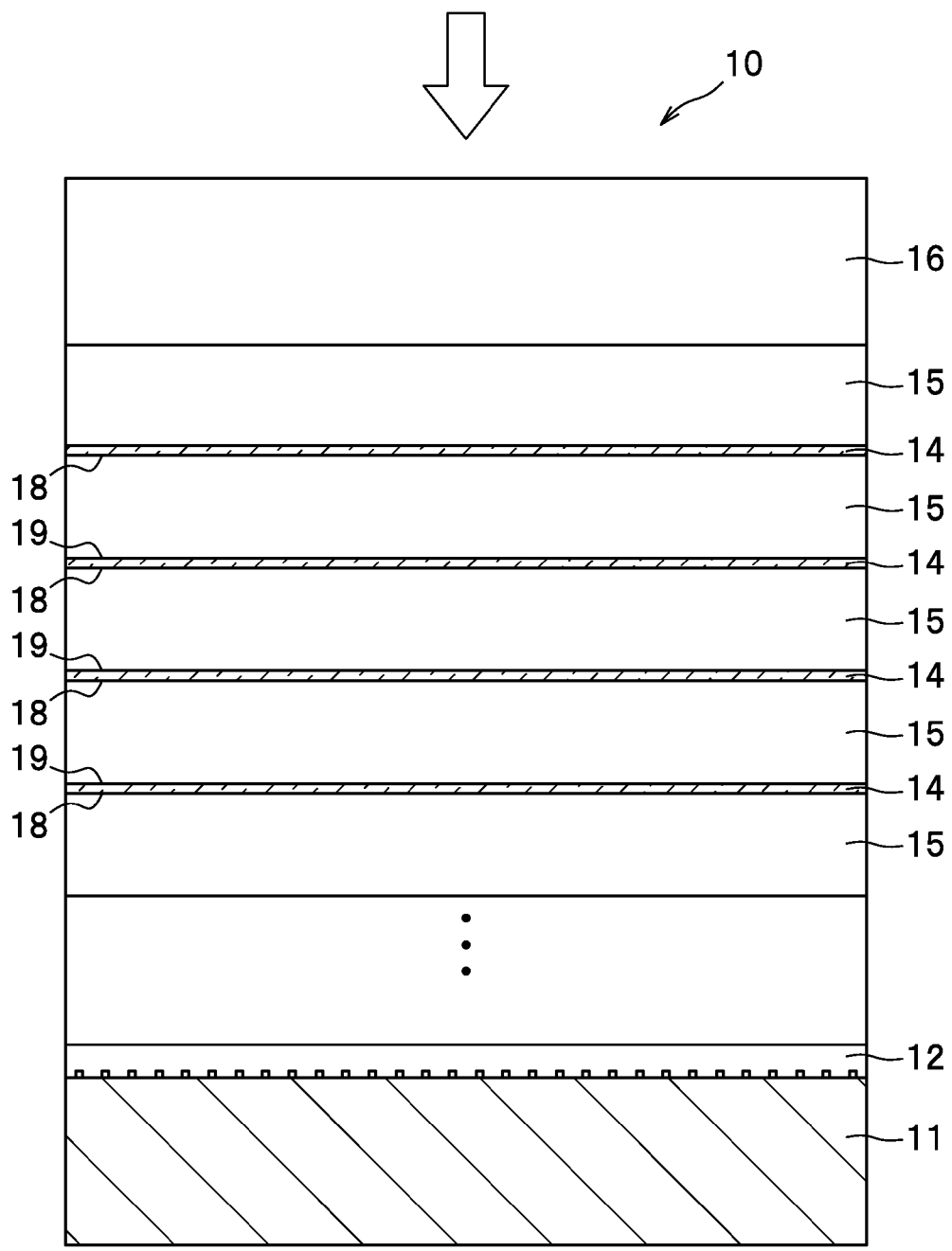
FIG. 1 is a sectional view of a multi-layered optical information recording medium.

As seen in FIG. 1, an optical information recording medium 10 according to one embodiment of the present invention comprises a substrate 11, a servo signal layer 12, a plurality of recording layers 14, a plurality of intermediate layers 15, and a cover layer 16.

The substrate 11 is a support member for supporting the recording layers 14 and other layers. As an example, the substrate 11 is a circular plate made of polycarbonate or glass. The material and the thickness of the substrate 11 are not specifically limited; the substrate 11 may be a relatively thick substrate having a thickness approximately from several hundred micro meters to several millimeters or a thin (approximately 10-200 μm in thickness) and flexible film member.

The servo signal layer 12 is made of a tacky or adhesive resinous material and configured to retain the recording layers 14 and the intermediate layers 15 on the substrate 11. A servo signal is previously recorded in the servo signal layer 12 at a surface close to the substrate 11; the servo signal is recorded as an irregular pattern or by utilizing the change in the refractive index. Herein, the servo signal is a previously set signal for assisting a recording and reading apparatus 1 to recognize the servo signal layer 12 as a focus reference surface during recording and reading out the information. To bring the focus on a predetermined recording layer 14, focus control is performed taking into account the distance from the reference surface and the number of interfaces. Further, to accurately irradiate the track of the circumferentially arranged recording spots with a laser beam at the time of recording and reading out the information, it is preferable that a tracking servo signal or a groove for tracking is previously provided. It is to be noted that the presence or absence of the servo signal layer 12 may be optional.

The recording layer 14 is made of a photosensitive material on which information is optically recordable. Irradiating the recording layer 14 with a recording beam (irradiated light for recording) causes the recording layer 14 to undergo a change in the refractive index. Change in the refractive index caused by irradiation of the recording beam may be an increase from a lower state to a higher state or alternatively a decrease from a higher state to a lower state. As an example in this embodiment, a recording material which undergoes a change in the refractive index from a higher state to a lower state is used in the recording layer 14.

In order to provide the recording layer 14 having an appropriate thickness and to change the refractive index of the recording layer using the heat generated as a result of dye absorbing light, the material for the recording layer 14 may be prepared, for example, by dispersing dye which allows absorption of the recording beam in a polymer binder. Specific examples of the polymer binder may include polyvinyl acetate (PVAc), polymethylmethacrylate (PMMA), polycarbonate (PC), polystyrene (PS), and polyvinyl alcohol (PVA). To increase the number of recording layers 14, it is preferable that the absorption ratio for the recording beam is as small as possible in the polymer binder. To be more specific, it is preferable that the absorption ratio of the polymer binder for the recording beam is 1% or lower, preferably 0.5% or lower, more preferably 0.3% or lower, and most preferably the absorption ratio is 0. The binder may contain light curing resin (UV curable resin) which is cured by irradiation with light. Further, in order to allow erasure of information, it is preferable that the polymer binder is resin (thermoplastic resin) having a glass transition point.

In contrast to the conventional recording layer in which the dye undergoes a change (e.g. decomposition) by absorption of the recording beam, the recording layer 14 is configured such that the refractive index of the polymer binder changes by receiving heat generated when the dye absorbs the recording beam. For this purpose, the polymer binder used in the present invention has a glass transition temperature lower than a melting point or a decomposition point of the dye. In other words, appropriate combinations of the polymer binder and the dye are selected so that the glass transition point of the polymer binder and the melting point or the decomposition point of the dye satisfy the above relationship.

Examples of the recording beam-absorbing dye may include one-photon absorption dyes which have been conventionally used as a thermally deformable heat mode type recording material. For example, a phthalocyanine-based compound, an azo compound, an azo metal complex compound, and methine dyes (e.g., a cyanine-based compound, an oxonol-based compound, a styryl dye, and a merocyanine dye) may be used as the recording beam-absorbing dye. Further, to minimize adverse effects on adjacent recording layers during recording on and reading from the recording medium having a multi-layered recording layers, it is preferable that a multi-photon absorption dye is used as the recording beam-absorbing dye. As an example of the multi-photon-absorption dye, a two-photon absorption compound without having a linear absorption band at the wavelength of a reading beam is preferable. Further, in order to achieve better recording sensitivity with respect to the recording beam, it is preferable that the recording layer 14 contains the one-photon absorption dye and the two-photon absorption dye.

It is preferable that the multi-photon absorption dye undergoes a multi-photon absorption reaction in response to light having a wavelength equal to or less than 650 nm. It is also preferable that the one-photon absorption dye undergoes a one-photon absorption reaction in response to light having a wavelength equal to or less than 650 nm. In particular, the wavelength of light which causes these reactions is preferably equal to or less than 550 nm, and more preferably equal to or less than 500 nm. Accordingly, the recording beam is focused to a small-sized spot to thereby improve the recording density.

When the recording material contains the multi-photon absorption dye and the one-photon absorption dye, the mixture ratio thereof is not specifically limited because it depends on the absorption ratio of each dye with respect to the recording beam or the recording sensitivity of each dye. The mixture ratio may be determined based on experiments, which demonstrates that the refractive index of the polymer binder efficiently changes while reducing the amount of the one-photon absorption dye to as small amount as possible. For determination of the mixture ratio, it is preferable that the concentration of the one-photon absorption dye is determined to satisfy the absorption ratio of the recording layer 14 for the recording beam, which will be explained next, while the concentration of the two-photon absorption dye is as close to the solubility limit as possible to improve the recording efficiency.

It is preferable that the recording layer 14 has linear absorption ratio (of one-photon absorption) with respect to the recording beam equal to or less than 5% per one layer. Further, it is more preferable that this absorption ratio is equal to or less than 2%, and it is further more preferable that the absorption ratio is equal to or less than 1%. This is because, for example, if the intensity of the recording beam which reaches the farthermost recording layer 14 has to be equal to or greater than 50% of the intensity of the radiated recording beam, it is necessary that the absorption ratio per one recording layer is equal to or less than 2% for obtaining thirty-layered recording layers, and that the absorption ratio per one recording layer is equal to or less than 1% for obtaining fifty-layered recording layers. If the absorption ratio of each recording layer 14 is set in this range, the recording layer 14 allows one-photon absorption of the recording beam to compensate for poor multi-photon absorption efficiency, and at the same time, the amount of absorption per one layer is restricted to a moderate amount to thereby reduce the loss of the recording beam at the time of recording in deeper layers and to achieve a multi-layered structure of the recording layers 14.

As long as the two-photon absorption dye does not have a linear absorption band at the wavelength of the reading beam, any known two-photon absorption dye may be used in the present invention; for example, compounds having a structure represented by the following formula (1) may be used.

[Chem. 1]

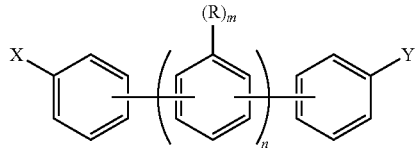

Formula (1)

In Formula (1), each of X and Y may represent a substituent having a Hammett's sigma para-value (σp value) of 0 or more, which may be the same with or different from each other; n represents an integer of 1 to 4; R represents a substituent, and a plurality of Rs may be the same with or different from each other; and m represents an integer of 0 to 4.

In Formula (1), each of X and Y represents a group having a σp value taking a positive value in Hammett equation, i.e., what is called an electron-withdrawing group, preferably, e.g., a trifluoromethyl group, a heterocyclic group, a halogen atom, a cyano group, a nitro group, an alkylsulfonyl group, an arylsulfonyl group, a sulfamoyl group, a carbamoyl group, an acyl group, an acyloxy group, an alkoxycarbonyl group and the like, more preferably a trifluoromethyl group, a cyano group, an acyl group, an acyloxy group, and an alkoxycarbonyl group, and most preferably a cyano group and a benzoyl group. Of these substituents, an alkylsulfonyl group, an arylsulfonyl group, a sulfamoyl group, a carbamoyl group, an acyl group, an acyloxy group and an alkoxycarbonyl group may further have a substituent for various purposes including giving solubility in a solvent. The examples of the substituents include an alkyl group, an alkoxy group, an alkoxyalkyl group, an aryloxy group, etc.

n represents an integer of 1 or more and 4 or less, preferably 2 or 3, and most preferably 2. If n is 5 or more, it is said that the greater n becomes, the more the linear absorption appears at the longer wavelength side, so that non-resonant two-photon absorption recording is not done with a recording beam at a wavelength band shorter than 700 nm.

R represents a substituent. The substituent is not specifically limited, and an alkyl group, an alkoxy group, an alkoxyalkyl group, and an aryloxy group are exemplified as specific examples. m represents an integer of 0 or more and 4 or less.

The compound having the structure represented by Formula (1) is not specifically limited; for example, compounds represented by the following chemical structural formulae D-1 to D-21 may be used.

[Chem. 2]

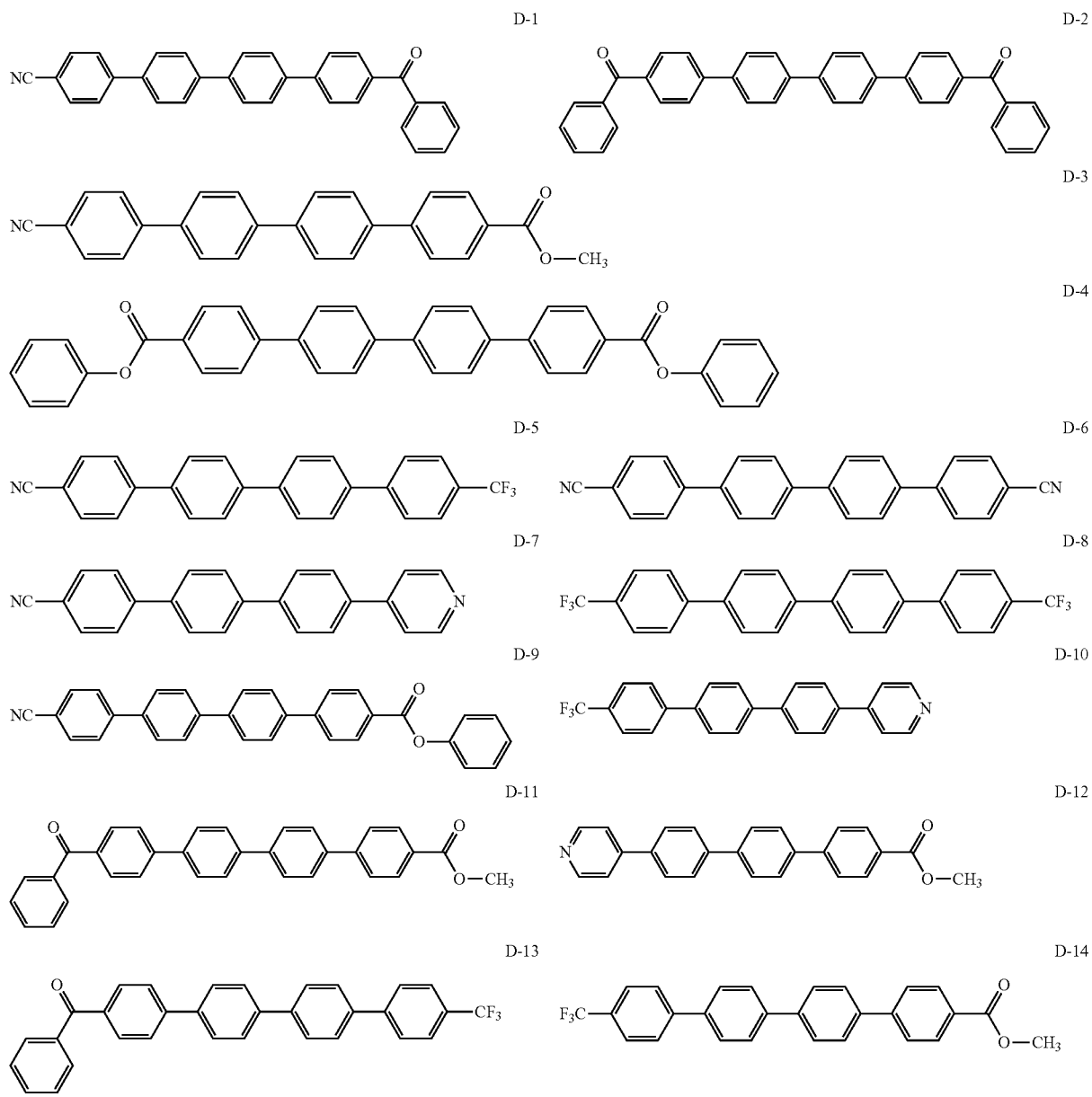

-continued

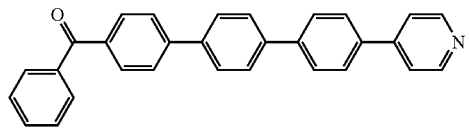
D-15

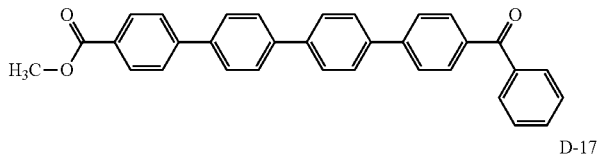
D-16

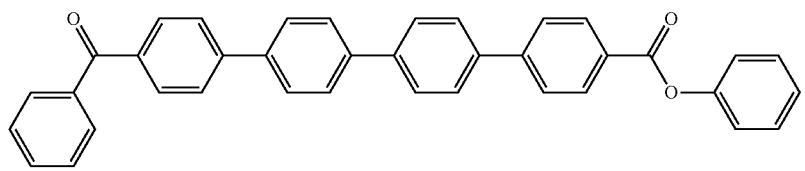
D-17

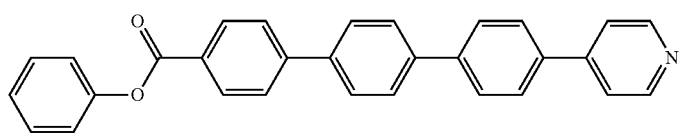
D-18

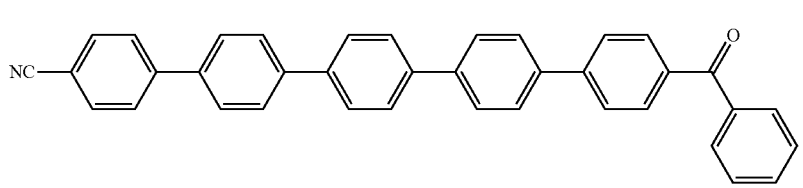
D-19

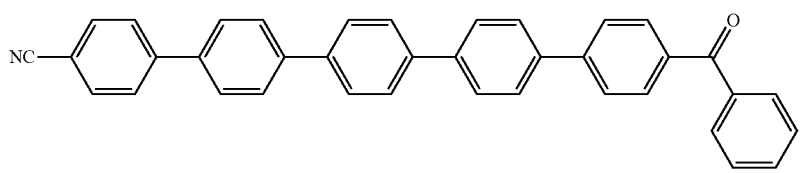
D-20

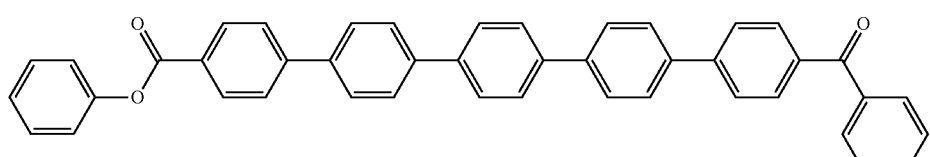

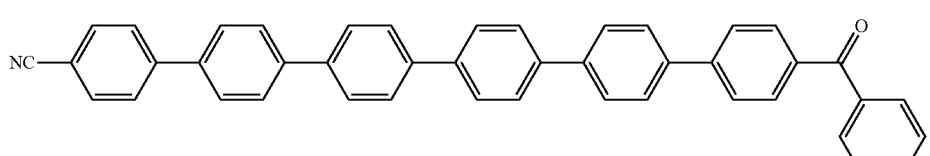
D-21

The one-photon absorption dye which can be used for the present invention may include dyes which have been conventionally used as a thermally deformable heat mode type recording material. For example, a phthalocyanine-based compound, an azo compound, an azo metal complex compound, and methine dyes (e.g., a cyanine-based compound, an oxonol-based compound, a styryl dye, and a merocyanine dye) may be used as the one-photon absorption dye.

Figure 2:
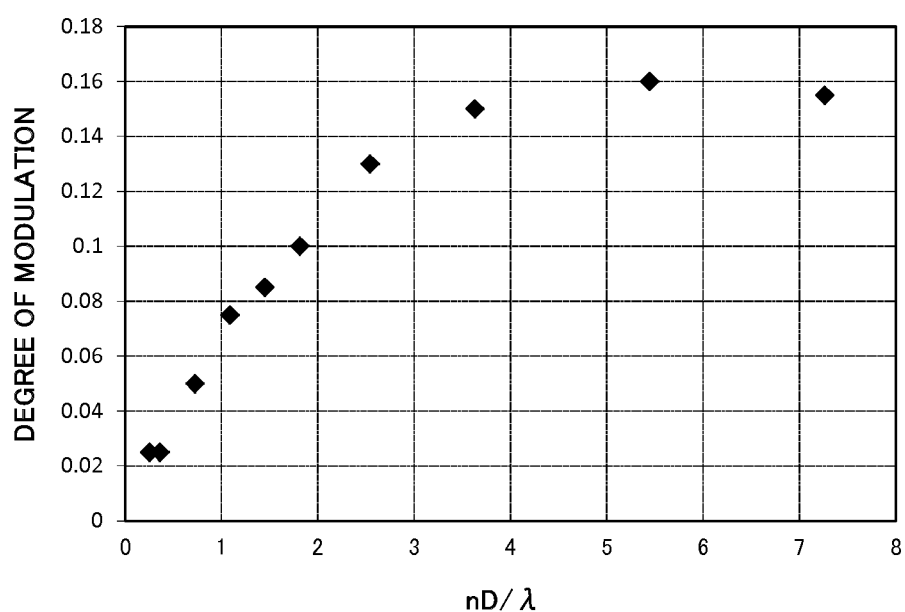
FIG. 2 is a graph showing the relationship between thickness of the recording layer and degree of modulation.

Preferably, the recording layer 14 has a sufficient thickness so that the distribution of the refractive index to be formed after recording achieve a lens effect. To be more specific, the recording layer 14 has a thickness equal to or greater than $2\lambda/n$, where $\lambda$ is the wavelength of the recording beam and n is the refractive index of the recording layer 14. As seen in FIG. 2, when calculating the relationship between $nD/\lambda$ (where D is the thickness of the recording layer) and degree of modulation (i.e., value obtained from the intensity of the detected light by (Maximum value−Minimum value)/Maximum value), if $nD/\lambda$, is equal to or greater than 2, the degree of modulation is 0.1 or more, and it is thus shown that an excellent degree of modulation is achieved. This reveals that the thickness D is preferably equal to or greater than $2\lambda/n$.

As an example, if the wavelength of the recording beam is 522 nm and the refractive index of the recording layer 14 is 1.48, the thickness of the recording layer 14 should be 705 nm or more. This thickness is several-fold thicker than that of the conventional optical information recording medium utilizing interference effect. Accordingly, when a recording spot is formed in the recording layer 14, the recording spot has a lens effect.

Although the thickness of the recording layer 14 does not have an upper limit, it is preferable that the thickness thereof is equal to or smaller than 5 μm in order to increase the number of recording layers 14 to as many as possible. In this embodiment, as an example, the thickness of the recording layer 14 is 1 μm. The number of recording layers 14 provided is, for example, approximately from 2-100 layers. To increase the storage capacity of the optical information recording medium 10, a large number of recording layers 14, for example, 10 or more recording layers 14 are preferable.

The recording layer 14 may be formed by any conventional method; for example, a dye material and a polymer binder are dissolved in a solvent, followed by spin coating with the obtained liquid to form a recording layer 14. Examples of the solvent may include dichloromethane, chloroform, methyl ethyl ketone (MEK), acetone, methyl isobutyl ketone (MIBK), toluene, and hexane.

As seen in FIG. 1, the intermediate layer 15 is disposed adjacent to upper and lower sides of each recording layer 14. The intermediate layer 15 is made of a material which is unreactive to irradiation with a laser beam at the time of recording and reading information. Further, in order to minimize the loss of the recording beam at the time of recording, it is preferable that the intermediate layer 15 is made of resin which is transparent to the recording beam. Herein, the term "transparent" indicates that the absorption ratio is equal to or less than 0.05%. As an example, the intermediate layer 15 may contain light curing resin (UV curable resin) which is curable by irradiation with light. In order to prevent crosstalk across a plurality of recording layers 14 (i.e., phenomenon by which a signal from one recording layer 14 is mixed with another signal from an adjacent recording layer 14), the intermediate layer 15 is provided to form a predetermined amount of space between the adjacent recording layers 14. For this purpose, the thickness of the intermediate layer 15 is equal to or more than 3 μm. As an example, the intermediate layer 15 is 10 μm thick in this embodiment.

It is preferable that the refractive index of the intermediate layer 15 be different to some appropriate degree from that of the recording layer 14 at least in proximity to an interface (far-side interface 18) between the intermediate layer 15 and a recording layer 14 disposed adjacent to an incident side of the intermediate layer 15 from which the recording beam enters the intermediate layer 15. This enables reflection of the reading beam at the far-side interface 18, so that information can be read out with a reflection-type scheme. To be more specific, it is preferable that the following relation is satisfied:

$$0.001 < ((n2-n1)/(n2+n1))^2 < 0.04$$

where n1 is a refractive index of the recording layer 14, and n2 is a refractive index of the intermediate layer 15.

If $((n2-n1)/(n2+n1))^2$ is greater than 0.001, the quantity of the reflected light at the far-side interface 18 is large, so that a high signal-to-noise ratio is obtained at the time of reading the information. Whereas, if $((n2-n1)/(n2+n1))^2$ is smaller than 0.04, the quantity of the reflected light at the far-side interface 18 is restricted to an appropriately small degree, so that a record/readout beam (i.e., beam including a recording beam, a reading beam, and a readout beam in this specification) can reach far deeper recording layers 14 upon recording and reading out the information.

As an example, the refractive index n2 of the intermediate layer 15 is 1.61. If the refractive index n1 of the recording layer 14 is 1.48, $((n2-n1)/(n2+n1))^2$ is 0.0018 and the aforementioned inequality expression is satisfied.

Further, it is preferable that the refractive index of the intermediate layer 15 is substantially the same as that of the recording layer 14 in proximity to an interface (near-side interface 19) between the intermediate layer 15 and a recording layer 14 disposed adjacent to the intermediate layer 15 at a side opposite to the incident side from which the recording beam enters the intermediate layer 15. In other words, in proximity to the near-side interface 19, the refractive index of the intermediate layer 15 is preferably comparable to that of the recording layer 14. The refractive index of the intermediate layer 15 may gradually change at any regions within a range from the far-side interface 18 to the near-side interface 19 such that it is different from the refractive index of the recording layer 14 in proximity to the far-side interface 18 whereas it is closer to the refractive index of the recording layer 14 in proximity to the near-side interface 19. To form this configuration, for example, the material for the recording layer 14 and the material for the intermediate layer 15 may be mixed together at the near-side interface 19 by dispersion. As an alternative, the intermediate layer 15 may be formed by a plurality of layer-formation processes during which materials for adjacent layers are dispersed. In order to disperse the materials for adjacent layers, the material for the first layer is applied, and before completely curing the material for the first layer, the material for the second layer is applied. Thereafter, these materials are cured.

With this configuration of the layers, reflection derived from an abrupt change in the refractive index does not occur at the near-side interface 19, so that the record/readout beam is allowed to pass through the near-side interface 19 without reflection.

The cover layer 16 is provided to protect the recording layers 14 and the intermediate layers 15. The cover layer 16 is made of a material which allows the record/readout beam to pass through the cover layer 16. The cover layer 16 has an appropriate thickness in the range from several tens micro meters to several millimeters.

Description will be given of the method for recording information on and reading out the information from the optical information recording medium 10 as described above.

Figure 3:
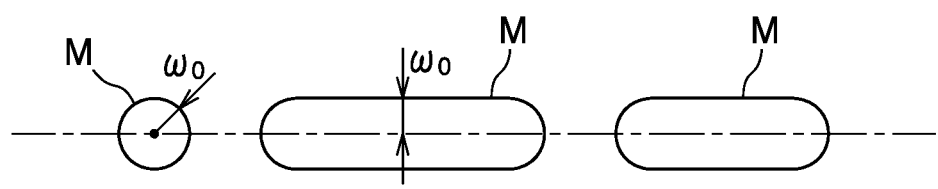
FIG. 3 is a top view of recording spots.
Figure 5:
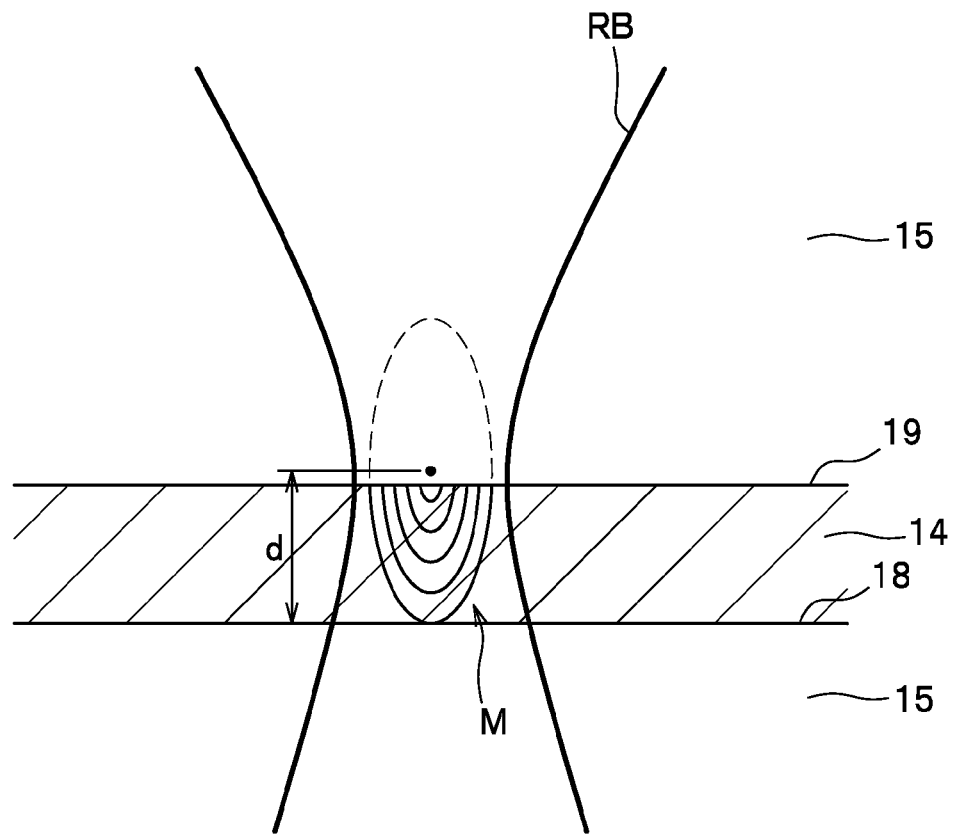
FIG. 5 is an explanatory view showing a focal position at the time of recording information and formation of a recording spot.

For recording information in a desired recording layer 14, the recording layer 14 is irradiated with a laser beam (recording beam RB) output of which is modulated in accordance with the information to be recorded. If the recording layer 14 contains a multi-photon absorption compound as a recording dye, it is preferable that the laser beam used for this recording may be a pulsed laser beam, the peak power of which can be increased. As seen in FIG. 5, it is preferable that a focal position of the recording beam RB is shifted by an offset amount d, which satisfies $\omega_0 < d < 3\omega_0$, from the far-side interface 18 toward the incident side of the recording beam RB. Herein, $\omega_0$ is the radius of the recording spots M shown in FIG. 3. As with the recording spot M shown in the left side of FIG. 3, the radius $\omega_0$ indicates the radius of a circular spot formed when the recording beam RB and the optical information recording medium 10 are not moved relatively to each other. If an elongated recording spot is obtained as a result of a relative movement between the recording beam RB and the optical information recording medium 10 as with the two recording spots M shown in the middle and the right side of FIG. 3, the radius $\omega_0$ is determined as a half of the width of the recording spot M.

Figure 4:
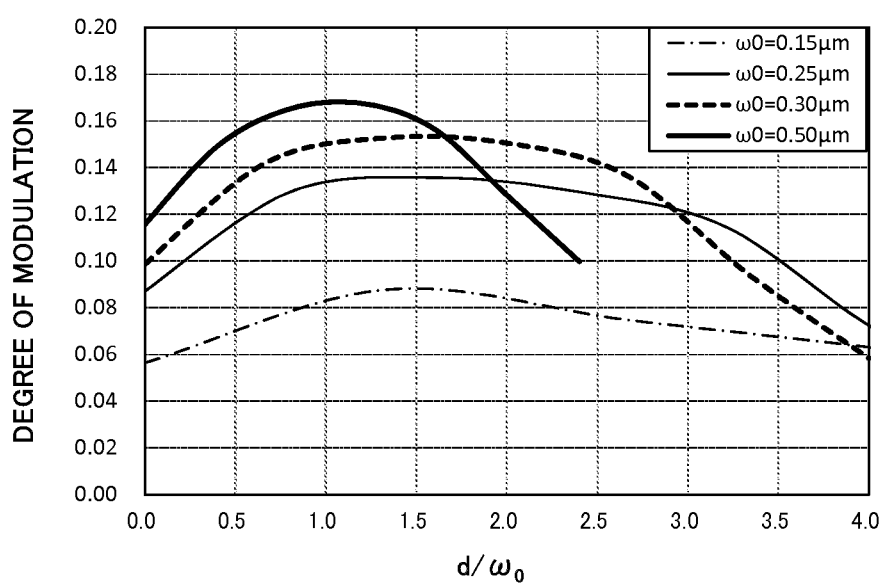
FIG. 4 is a graph showing the relationship between $d/\omega_0$ and degree of modulation.

Description will be given of the range of the offset amount d. First, the radius $\omega_0$ of a fine spot which can be formed by the laser beam is considered to be in the range of 0.1-0.3 μm. The radius $\omega_0$ of the spot to be recorded is determined from the diffraction limit which is determined by the wavelength of the recording beam used and the numerical aperture NA of the objective lens. It is preferable that the radius $\omega_0$ is approximately in the range of 0.1-0.3 μm taking into consideration the surface recording density per one recording layer 14 and the wavelength of the recording laser used. Calculating the relationship between the ratio $d/\omega_0$ of the offset amount d to the radius $\omega_0$ and the degree of modulation as shown in FIG. 4 reveals that better degree of modulation can be obtained if $\omega_0$=0.15-0.3 μm and the value of $d/\omega_0$ is in the range of 1-3. Therefore, it is said that better offset amount d is in the range of $\omega_0 < d < 3\omega_0$. In this calculation, the thickness of the recording layer 14 is 1 μm.

When the recording layer 14 is irradiated with the recording beam RB as described above, as schematically illustrated in FIG. 5, depending on the intensity of light, a light absorption reaction is induced more in the proximity of the focal point where the intensity of the light is strong (light is absorbed proportionally to the square of the intensity of the light in the case of the two-photon absorption reaction), at which position the refractive index is small in proportion to this reaction. For this reason, the distribution of the refractive index is formed in the recording layer 14 of 1 μm thick. The recording spot M with this distribution of the refractive index acts as a lens.

Figure 6:
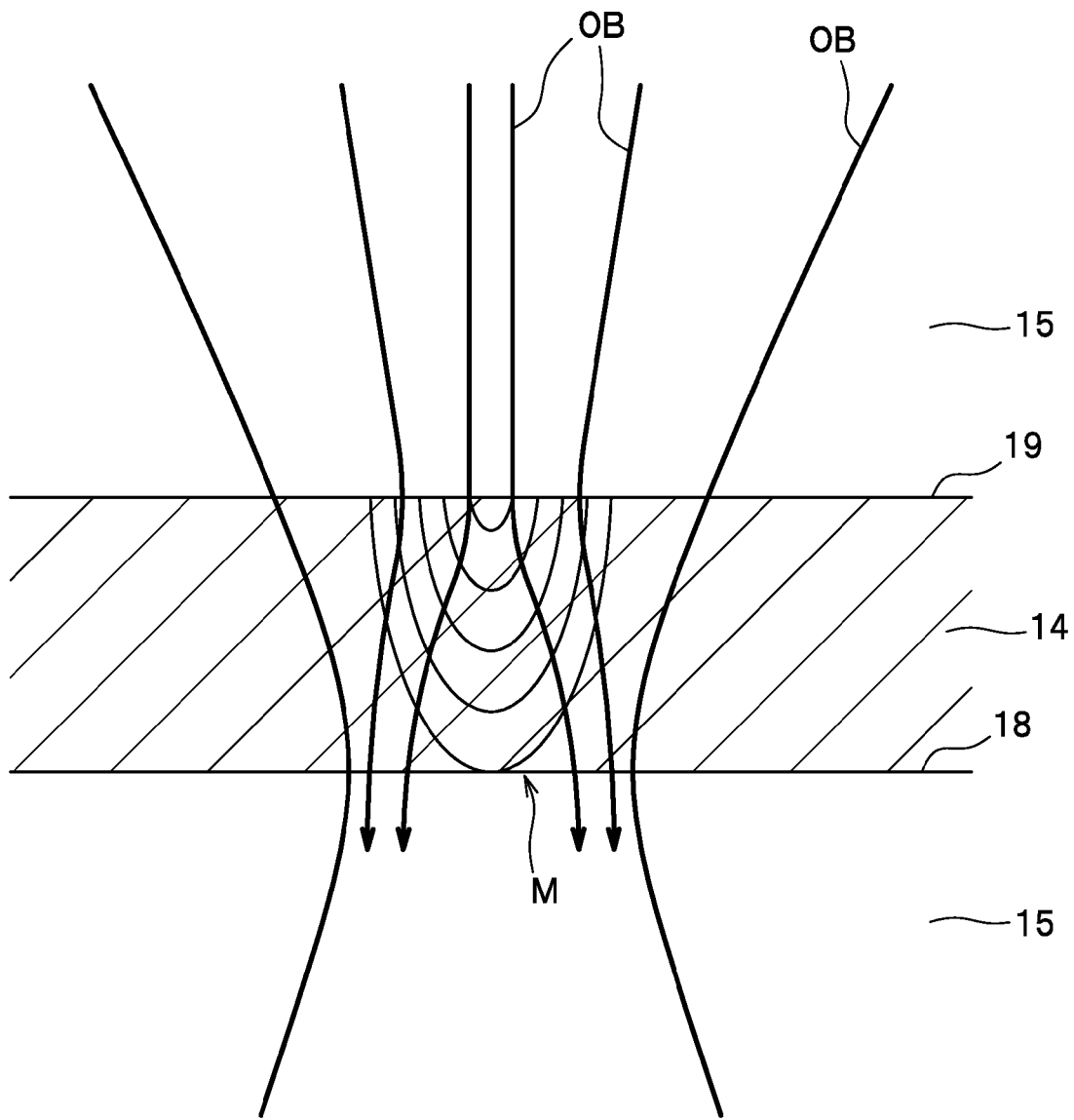
FIG. 6 is an explanatory view showing a focal position at the time of reading out the information and the lens effect at the recording spot.

For reading out the information from a desired recording layer 14, the recording layer 14 is irradiated with a CW laser beam (reading beam OB). In this instance, as seen in FIG. 6, the focal position of the reading beam OB is adjusted with the far-side interface 18 between the recording layer 14 and the intermediate layer 15 set as a target. The reading beam OB then enters the recording spot M, and due to the lens effect of the recording spot M, it advances along a path diverging from the recording spot M. For this reason, almost no light is reflected at the far-side interface 18 of the recording spot M. Meanwhile, as seen in FIG. 7, at a non-recorded portion of the recording layer 14, which is a portion other than recording spots M, the reading beam OB is reflected at the far-side interface 18 and therefore a difference in the intensity of the reflected light is obtained between the recorded portion and the non-recorded portion. Therefore, the information is regenerated.

To erase the information recorded in the recording layer 14, the recording layer 14 is heated to a temperature around the glass transition temperature of the polymer binder, preferably to a temperature higher than the glass transition point, so that the fluidity of the polymer binder can be increased and the refractive index thereof and the ambient refractive index become uniform. As a result, the information recorded in the recording layer 14 can be erased. Because the information is erasable, re-recording in the recording layer 14 (repeated recording) can be achieved. When the recording layer 14 is heated in this manner, the recording layer may be irradiated with a continuous-wave laser beam while bringing the laser beam into focus on the recording layer 14. Heating with a continuous-wave laser beam makes it possible to evenly erase the information recorded in a continuous region within the recording layer 14. The continuous-wave laser beam used may be the laser beam used for reading out the information, or alternatively, another laser beam may be used. In both cases, it is preferable that a laser beam used emits light having a wavelength absorbable by a one-photon absorption dye.

Further, when the information is to be erased by heating the recording layer 14, the optical information recording medium 10 as a whole may be heated to a temperature higher than the glass transition temperature of the polymer binder so that the information recorded in all the recording layers 14 can be erased at once. Accordingly, irrespective of the kind of dyes contained in the recording layer 14, all the information recorded in the optical information recording medium is easily erased for initialization. Further, when the optical information recording medium is disposed of, the information can be easily erased.

As described above, according to the optical information recording medium 10 in this embodiment, recording and reading of information is carried out by making use of a difference in the reflectivity between a recorded portion and a non-recorded portion of the far-side interface 18. However, according to the conventional recording method, the information is regenerated by making use of interference effect between the reflection at the far-side interface 18 and the reflection at the near-side interface 19, and therefore the reflection at the near-side interface 19 is indispensable. Contrary to the conventional recording method, the reflection at the near-side interface 19 is not necessary for the recording method described in this embodiment, but rather considered as noise. For this reason, according to one example in this embodiment, the refractive indices of the recording layer 14 and the intermediate layer 15 are gradually changed at the near-side interface 19, so that reflection of the record/readout beam does not occur at the near-side interface 19 and the signal-to-noise ratio of the readout beam can be improved.

Further, according to the optical information recording medium 10 as described above in this embodiment, since the modulation for the reproduction output (intensity of the reflected light) is obtained between the recorded portion and the non-recorded portion without using interference effect and by making use of the lens effect of the recording spot M formed in the recording layer 14, the optical information recording medium 10 can be manufactured without requiring highly-accurate film thickness of the recording layer 14 and thus with reduced manufacturing cost. Further, since the reflection of the reading beam at the far-side interface 18 is used upon reading out the information, a higher reproduction output is obtained as compared with a method utilizing fluorescence.

Although one exemplary embodiment of the present invention has been described above, the present invention is not limited to the above-described embodiment and various changes and modifications may be made where necessary.

For example, in the above embodiment, the refractive index of the recording layer 14 decreases by irradiation with the recording beam. However, a recording material which increases the refractive index by irradiation with the recording beam may be used instead. In this instance, as seen in FIG. 8, since the recording spot M acts to collect the reading beam OB, the recorded portion reflects the reading beam OB with a reflectivity higher than that of the non-recorded portion, so that the modulation is generated by the difference in the intensity of the reflected light between the recorded portion and the non-recorded portion. Of course, to increase the degree of modulation to obtain a higher signal-to-noise ratio in the reproduction output, as with the above embodiment, it is preferable that the recording layer 14 contains a recording material which decreases the refractive index by irradiation with the recording beam.

In the above embodiment, the material for the recording layer 14 and the material for the intermediate layer 15 are applied by spin coating. However, as long as a proper coating film having a desired thickness is obtained, the application method is not limited to the spin coating.

As a preferable example in the above embodiment, the refractive index of the intermediate layer 15 gradually changes at any regions in the thickness direction. However, the intermediate layer 15 may have a constant refractive index throughout the thickness direction.

EXAMPLES

Description will be given of experiments for recording on and erasing from an optical information recording medium according to the present invention.

1. Recording Material

In these examples, a recording material which contains a polymer binder and dye dispersed in the polymer binder was used (1) Polymer Binder Polyvinyl acetate (from Across Co., Ltd.; Mw: 101600) or polymethylmethacrylate (from SIGMA-ALDRICH Corporation) was used as the polymer binder.

(2) Dye

Either one of or both of phthalocyanine-based one-photon absorption dye with the following structure C-1 and two-photon absorption dye with the following structure C-2 were used as the dye.

[Chem. 3]

C-1

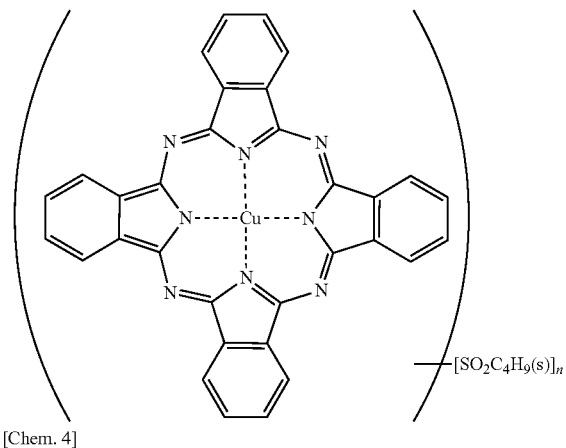

[Chem. 4]

C-2

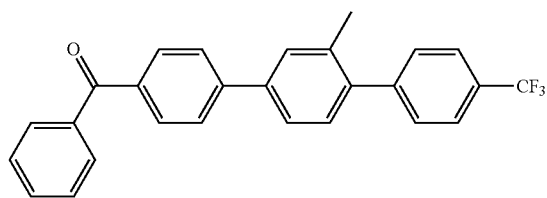

2. Formation Method for Recording Layer

Dye and a polymer binder were dissolved in a solvent (described later) while stirring to obtain a coating liquid. The coating liquid was applied to a glass substrate by spin coating to form a film on the glass substrate. The thickness of the film was 1 μm. The refractive to index of the glass substrate was 1.53.

3. Thermal Analysis Method for the Material

The glass transition temperature of the polymer binder and the melting point and the decomposition point of the dye were determined by the following method.

Analytical method: TG-DTA (thermogravimetric/differential thermal analyzer) measurement Device: TG-DTA6300 (from Seiko Instruments Inc.)
Rate of temperature increase: 10° C./min
Measured temperature range: from 25° C. to 600° C.
Measured atmosphere: nitrogen ($N_2$) atmosphere The following temperatures were used as the glass transition temperature, the melting point, and the decomposition point (or vaporization temperature).

(1) Glass Transition Temperature

In an endothermic reaction of the polymer binder without weight reduction, the peak temperature was regarded as the glass transition temperature.

(2) Melting Point

In an endothermic reaction of the dye without weight reduction, the peak start time obtained by extrapolation was regarded as the melting point.

(3) Decomposition Point (or Vaporization Temperature)

The decomposition point (or vaporization temperature) was determined as the temperature at which the weight of the dye was reduced by 10% as compared with the dye before the decomposition. If a plurality of decomposition points existed, the lowest temperature was used for comparison.

Results of this thermal analysis were shown in the following table.

TABLE 1

|  | Glass transition temperature [° C.] | Melting point [° C.] | Decomposition temperature [° C.] |
| --- | --- | --- | --- |
| Polymer binder |  |  |  |
| Polyvinyl acetate | 32 | — | — |
| polymethylmethacrylate | 104 | — | — |
| polybisphenol-A-carbonate | 147 | — | — |
| One-photon absorption dye |  |  |  |
| C-1 compound | — | — | 349 |
| Two-photon absorption dye |  |  |  |
| C-2 compound | — | 138 | 301 |

4. Test/Estimation Method for Recording and Reading Information

The recording layer was irradiated with a recording beam (pulsed laser: wavelength of 522 nm, repetition frequency of 3 GHz, pulse width of 500 fsec, average power Pa of 5-50 mW, and peak power Pp of 3-33 W) with the peak power of 10 W.

With respect to the recording layer, the focal position of the recording beam was moved in the optical axis direction by 0.4 μm increments from 0.4 to 4 μm (i.e., 11 points in the depth direction), and a test was performed for four points each including these 11 focal positions, namely the total of 44 recording positions were tested.

Recording conditions were adjusted by changing the recording time from 5 μs to 5 ms. The recording time [μs] required for recording 12 recording marks (i.e., 3 points at adjacent focal positions in each depth direction times the four points) was measured to obtain data.

5. Conditions of Examples and Comparative Examples

Conditions of examples and comparative examples were as follows:

Example 1

| Solvent | methyl ethyl ketone (MEK) | 7 g |
| --- | --- | --- |
| Dye | C-1 compound | 15 mg |
| Polymer binder | polyvinyl acetate (PVAc) | 500 mg |

Example 2

Conditions of Example 2 were the same as those of Example 1, except that the following compound was used as the dye.

| Dye | C-2 compound | 72 mg |
| --- | --- | --- |

Example 3

Conditions of Example 3 were the same as those of Example 1, except that the following two compounds were used as the dye.

| Dye | C-1 compound | 15 mg |
|---|---|---|
|  | C-2 compound | 72 mg |

Example 4

Conditions of Example 4 were the same as those of Example 2, except that the polymer binder was replaced with the following one:

| Polymer binder | polymethylmethacrylate (PMMA) | 500 mg |
|---|---|---|

Comparative Example 1

Unlike Example 2, the recording layer was produced without using the polymer binder and only with the C-2 compound (two-photon absorption dye).

Comparative Example 2

Conditions of Comparative Example 2 were the same as those of Example 2, except that the polymer binder was replaced with the following one:

| Polymer binder | polybisphenol-A-carbonate (from SIGMA-ALDRICH Corporation; Mw: 29000) | 500 mg |
|---|---|---|

6. Results

With respect to the above Examples and Comparative Examples, configurations and recording times were shown in FIG. 9.

As seen in FIG. 9, according to Examples 1-4, the glass transition temperature of the polymer binder was lower than the melting point or the decomposition point of the dye. This meets the requirement of the present invention. Recording marks were formed in any of Examples 1-4.

Reference is now made to Examples 1-3, in which polyvinyl acetate was used as the polymer binder. When only the two-photon absorption dye (C-2) was used as the dye (Example 2), it took 90 μsec to form a recording mark. When only the one-photon absorption dye (C-1) was used as the dye (Example 1), it took 15 μsec to form a recording mark. Further, when both of the one-photon absorption dye (C-1) and the two-photon absorption dye (C-2) were used as the dye, it took only 5 μsec to form a recording mark. Namely, recording at the highest sensitivity was observed when both of the one-photon absorption dye and the two-photon absorption dye were used.

In Example 4, the polymer binder with a higher glass transition temperature was used, and it took more time to form a recording mark than Examples 1-3. However, recording could still be made in only 450 μsec.

In Comparative Example 1, a recording mark was not formed under conditions of no polymer binder and with a smaller absorption ratio of 1.8%.

In Comparative Example 2, a recording mark was not formed under conditions that the glass transition temperature of the polymer binder was higher than the melting point of the dye and the recording beam had the peak power of 10 W.

The above results show that an optical information recording medium according to the present invention enables recording at high sensitivity. According to the research paper entitled: "The static recording and read out of the twenty-recording layers containing organic dye materials" (Yuki Suzuki et al.; ISOM'09 Technical Digest, P. 202 (Presentation number: Tu-PP-09), the purpose of which is to achieve recording in the recording layer using one-photon absorption dye to be decomposed by irradiation with a laser beam and even with a low absorption ratio of the recording layer, a recording medium with twenty recording layers was produced such that the absorption ratio of the recording beam per one recording layer was equal to lower than 16%, and recording was carried out using a 2.8 mw, 405 nm laser diode. In this instance, recording in the first recording layer was made by irradiation duration from 8 to 400 ms. Even when comparing the above Examples with this report, it was shown that a high sensitivity recording was performed in the optical information recording medium according to the present invention.

[Erasing Records]

The optical information recording media with recording marks formed in Examples 1-3 (i.e., media containing polyvinyl acetate as the polymer binder) were heated for one hour at 80° C. using an oven. The optical information recording medium with recording marks formed in Example 4 (i.e., medium containing polymethylmethacrylate as the polymer binder) was heated for one hour at 120° C. using an oven. In any of these optical information recording media, the recording marks disappeared, which showed that the records were erasable.

What is claimed is:

1. An optical information recording medium comprising:
   a plurality of recording layers, each of which undergoes a change in a refractive index by irradiation with a recording beam; and
   at least one intermediate layer provided between the recording layers,
   wherein each of the recording layers contains a polymer binder and dye dispersed in the polymer binder,
   wherein at least in proximity to an interface between the intermediate layer and a recording layer disposed adjacent to an incident side of the intermediate layer from which the recording beam enters the intermediate layer, the intermediate layer has a refractive index different from that of the recording layer,
   wherein a glass transition temperature of the polymer binder is lower than a melting point and a decomposition point of the dye, and
   wherein a refractive index of the polymer binder changes by receiving heat generated when the dye absorbs the recording beam, whereby information is recordable in the recording layer.

2. The optical information recording medium according to claim 1, wherein the recording layers have an absorption ratio for the recording beam equal to or less than 5% per one layer.

3. The optical information recording medium according to claim 1, wherein each recording layer has a thickness equal to or greater than $2\lambda/n$, where n is the refractive index of the recording layer and $\lambda$ is a wavelength of the recording beam.

4. The optical information recording medium according to claim 1, wherein in proximity to an interface between the intermediate layer and a recording layer disposed adjacent to the intermediate layer at a side opposite to the incident side from which the recording beam enters the intermediate layer, the intermediate layer has a refractive index substantially the same as that of the recording layer.

5. The optical information recording medium according to claim 1, wherein the dye comprises a one-photon absorption dye.

6. The optical information recording medium according to claim 1, wherein the dye comprises a multi-photon absorption dye.

7. The optical information recording medium according to claim 1, wherein the dye comprises a one-photon absorption dye and a multi-photon absorption dye.

8. A method for erasing information recorded in an optical information recording medium of claim 1, comprising the step of:
   heating the recording layer, whereby the information recorded in the recording layer is erased.

9. The method according to claim 8, wherein the recording layer is heated by being irradiated with a continuous-wave laser beam focused on the recording layer.

10. The method according to claim 8, wherein the optical information recording medium as a whole is heated, whereby all the information recorded in the recording layer is erased.

* * * * *